Patented Nov. 9, 1948

2,453,578

UNITED STATES PATENT OFFICE 2,453,578

PREPARATION OF CHEMILUMINESCENT COMPOSITION OF MATTER

Harold T. Lacey, Plainfield, and Robert E. Brouillard, Somerville, N. J., assignors to American Cyanamid Company, New York, N. Y., a corporation of Maine No Drawing. Application February 19, 1944, Serial No. 523,157

2 Claims. (Cl. 260—250)

This invention relates to an improved process of preparing chemiluminescent materials. More particularly, the invention refers to a process of preparing nitro-1,4-dioxo-tetrahydrophthalazines such as the 5- and 6-nitro derivatives and the corresponding 5- and 6-amino-1,4-dioxo-tetrahydrophthalazines and to a product so produced.

Various chemiluminescent compositions have been prepared, making use of materials which give off light when oxidized in aqueous solution. One of the best materials for this purpose has been found to be 5-amino-1,4-dioxo-tetrahydrophthalazine which may be represented by the formula:

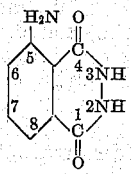

It has the property of showing a bright, bluish luminescence when so used. Preferably such compositions also contain a catalyst which serves to intensify the luminescence. Recently such compositions have been the subject of considerable interest as "sea markers," as shown for example in the copending applications for U. S. Letters Patent Serial No. 477,855, filed March 3, 1943, by Lacey and Millson, now abandoned, and Serial No. 477,856, filed March 3, 1943, by Lacey, Millson and Heiss, now Patent No. 2,420,286, dated March 3, 1943.

One of the best known methods of preparing 5-amino-1,4 - dioxotetrahydrophthalazine is from phthalic anhydride. The latter is first nitrated with mixed acid to produce a mixture of 3- and 4-nitrophthalic anhydrides and the 4-isomer is then extracted from the mixture with water, in which it is considerably more soluble than the 3-derivative. The remaining 3-nitrophthalic acid is then condensed in aqueous medium with hydrazine sulfate, usually in the presence of a suitable acid binder such as sodium acetate or the like. The condensation results in the formation of 3-nitro-N-amino phthalimide which may be represented by the formula:

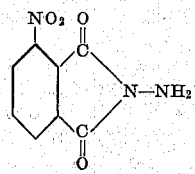

By molecular rearrangement, this product is converted to the isomeric 5-nitro-1, 4-dioxo-tetrahydrophthalazine of the formula:

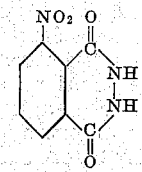

Subsequently, the nitro derivative is reduced to the corresponding 5-amino derivative by any suitable procedure.

Condensation of 3-nitrophthalic acid with hydrazine sulfate and the subsequent rearrangement of the resulting 3-nitro-N-amino phthalimide are difficult operations to carry out from a technical point of view. Both the nitrophthalic acid and the hydrazine sulfate are but sparingly soluble in water and the product, 3-nitro-N-amino phthalimide, is similarly difficultly soluble in water. Furthermore, the product is obtained in an aqueous slurry which must be evaporated to dryness and heated to 160° C. in carrying out the subsequent rearrangement. Not only is considerable time required but the yields are not as high as desired. While these operations may be quite readily carried out in the laboratory, they offer obviously difficult problems if they are to be done on a commercial scale.

Because of these technical difficulties, the production of suitable 5-amino-1,4-dioxo-tetrahydrophthalazine for practical use has been both troublesome and unsatisfactory. It is, therefore, the principal objection of the present invention to provide a suitable process for carrying out this production in a simpler and faster manner and one which will enable the production of greater amounts of useful material.

These desired objects are achieved by taking advantage of several rather surprising discoveries. The first is that the condensation of either the 3- or the 4-nitrophthalic acid can be carried out at moderate temperatures in concentrated sulfuric acid. Further, it has also been found that the subsequent rearrangement may be accomplished in the same medium. Both reactions proceed smoothly and without difficulty, thus eliminating the troublesome steps of the prior art which were set forth above.

A still further practical advantage is obtained through the discovery that in spite of the prior art teaching that the 6-amino derivative does not luminesce with the brilliance of the 5-amino compound, a mixture of the two is substantially equal in brilliance to the isolated 5-amino compound. Thus it is perfectly feasible to treat the mixture of 3- and 4-nitrophthalic anhydrides obtained from the phthalic anhydride-mixed acid reaction. By taking advantage of these findings it is readily possible not only to eliminate the separation step of the prior art but to obtain a very decided improvement in the yield of useful products.

Expressed in general terms therefore, the process of the present invention comprises condensing either the 3- or 4-nitrophthalic anhydride or a mixture of them with hydrazine sulfate in concentrated sulfuric acid and then carrying out the molecular rearrangement in the solution. Reduction of the nitro to the amino compounds may be carried out by any suitable method, for example, by the aid of sodium hydrosulfide.

One of the principal advantages of not separating the 3- and 4-nitrophthalic acids in the process of the present invention lies in the fact that they can thereby be utilized directly in the sulfuric acid solution which results from the nitrating operation. This solution may be appropriately diluted with slightly weaker sulfuric acid and the subsequent steps carried out without any necessity for isolating the nitrated phthalic acids. If the sulfuric acid solution obtained in the nitrating operation is so used, it is of advantage to remove any nitrous or nitric acids remaining in the nitration mixture before carrying out the condensation with hydrazine sulfate. This may be readily carried out by bubbling a small amount of sulfur dioxide therethrough.

Condensation with hydrazine sulfate is carried out by adding the latter in solid form to the nitrophthalic anhydride in sulfuric acid solution. Heat is necessary to initiate the reaction but otherwise the latter proceeds smoothly and with no particular technical difficulty. Temperature ranges of from about 60° to 130° C. have been found to yield satisfactory results. Practically, however, it has been found best to limit the temperature range to about 85° to 100° C., at which temperatures the reaction proceeds at a suitable rate for industrial production. At the end of the heating period the products are found to be nitro-1,4-dioxo-tetrahydrophthalazines. Theoretically, they pass through the intermediate state of being nitro-N-amino-phthalimides but as a practical consideration it cannot be stated whether or not this actually occurs.

The invention will be more fully illustrated in conjunction with the following example which is meant to be illustrative only and not by way of limitation. All parts are by weight unless otherwise noted.

*Example*

150 parts of sulfuric acid is heated to 95° C. and 148 parts of phthalic anhydride added thereto with stirring over a ten minute period. With the temperature of the above slurry at 95° C., 238 parts of mixed acid ($H_2SO_4$ 56.5%; $HNO_3$ 27%) is added to the partially dissolved phthalic anhydride at such a rate that the temperature does not exceed 105° C. The temperature of the reaction mixture is then maintained at 95–100° C. until the nitration is completed. Sulfur dioxide is introduced into the hot reaction mixture until a negative test for nitrate and nitrite is obtained. The mixture is then diluted with 273 parts of sulfuric acid, and 130 parts of hydrazine sulfate is added. The mixture is then heated to 95° C., maintained at this temperature for several hours to insure completion of the rearrangement and then poured into 1500 parts of ice. After stirring for 15 minutes, the cooled mixture is filtered and the residue washed with 500 parts of water. For the reduction, the wet press cake of 5- and 6-nitro-1,4-dioxo-tetrahydrophthalazine is then slurried in 250 parts of water and 5N sodium hydroxide is slowly added until the solution is alkaline to litmus. The mixture is then heated to 60° C. and 96 parts of a 47.8% solution of sodium hydrosulfide is added over a forty-five minute period. When the addition is complete, the temperature is raised to 95° C. and maintained at this point for several hours. After heating, the mixture is diluted with 1,000 parts of water, filtered and the filtrate acidified with 5N sulfuric acid. The resulting precipitated mixture of 5- and 6-amino-1,4-dioxo-tetrahydrophthalazine is filtered off and dried at 90° C.

As produced by the process of the present invention, the amino-1,4-dioxo-tetrahydrophthalazines ordinarily contain sulfur which is precipitated when the reduction liquor is acidified with sulfuric acid. It has been found that the presence of the sulfur has no detrimental effect on the chemiluminescence. If so desired, this sulfur may be readily eliminated, for example, the sulfur-containing material may be dissolved in alkali, filtered and reprecipitated by acidification.

As was pointed out above, one of the advantages of the present process lies in the utilization of the mixed anhydrides without isolating them. The process however is not necessarily so limited. Instead of starting with a mixture of 3-nitro and 4-nitrophthalic anhydrides as in the above example, either of the isomers, prepared by any suitable method may be employed. Either of the isomeric 3- or 4-nitrophthalic anhydrides may be reacted with hydrazine sulfate in sulfuric acid as described above, to produce the 5- or the 6-nitro-1,4-dioxo-tetrahydrophthalazines respectively.

Several important advantages are obtained by the use of the persent process, particularly when a mixture of the isomers is prepared. In that case, all the stepwise reactions, starting from the phthalic anhydride and ending up with the nitro-dioxo-tetrahydrophthalazines may be performed in the same medium, in the same vessel, without isolation of any intermediate product. Even when the isomers are separated, the process still has the important advantage that the conversion of the particular nitrophthalic anhydride to the corresponding nitro-dioxo-tetrahydrophthalazine can be carried out in solution in a technically feasible manner.

As was also pointed out above, in the preparation of a chemiluminescent composition of matter, to be used e. g. as sea marker, it is not necessary to separate the two isomers. The mixture of the 5- and 6-amino-1,4-dioxo-tetrahydrophthalazines is for all practical purposes equivalent in efficiency to the pure 5-amino isomer. Since such a luminescent mixture can be prepared in a considerably higher yield than the pure isomer and at a considerably lower cost, not only as to the materials used, but also as far as the conversion cost is concerned, the advantage in so doing is quite apparent.

We claim:

1. A process of preparing a mixture of 5- and 6-nitro-1,4-dioxotetrahydrophthalazines which comprises reacting a mixture, obtained by nitrating phthalic anhydride with a mixture of concentrated sulfuric and nitric acids and then bubbling sulfur dioxide therethrough for a sufficient time to destroy any residual nitric acid, with hydrazine sulfate in concentrated sulfuric acid.

2. A mixture of 5- and 6-nitro-1,4-dioxotetrahydrophthalazines obtained by reacting a mixture, obtained by nitrating phthalic anhydride with a mixture of concentrated sulfuric and nitric acids and then bubbling sulfur dioxide therethrough for a sufficient time to destroy any residual nitric acid, with hydrazine sulfate in concentrated sulfuric acid.

HAROLD T. LACEY.
ROBERT E. BROUILLARD.

REFERENCES CITED

The following references are of record in the file of this patent:

Chem. Abstracts, vol. 37, page 651.
Chem. Abstracts, vol. 30, page 2559–60.
Chem. Abstracts, vol 31, pages 2188–89.
Chem. Abstracts, vol. 28, page 1684.
Groggins, "Unit Processes in Organic Chemistry," pages 83, 84 (1938).